United States Patent [19]
Bickford

[11] 3,939,407
[45] Feb. 17, 1976

[54] PLURAL CHANNEL COMMUNICATIONS SYSTEM

[75] Inventor: William J. Bickford, Weston, Mass.

[73] Assignee: Raytheon Company, Lexington, Mass.

[22] Filed: Dec. 3, 1973

[21] Appl. No.: 421,013

[52] U.S. Cl. ............... 325/47; 178/67; 179/15 BM
[51] Int. Cl.² ............................................ H04L 7/02
[58] Field of Search... 179/15 BM, 15 BY; 329/120, 329/137; 178/67; 325/47, 48

[56] References Cited
UNITED STATES PATENTS

| | | | |
|---|---|---|---|
| 3,160,812 | 12/1964 | Scantlin | 179/15 BM |
| 3,427,543 | 2/1969 | Ito | 325/47 |
| 3,773,979 | 11/1973 | Kirk et al. | 179/15 BM |

OTHER PUBLICATIONS
Bennett et al., Data Transmission, 1965, pp. 252–254.

*Primary Examiner*—George H. Libman
*Attorney, Agent, or Firm*—David M. Warren; Joseph D. Pannone; Milton D. Bartlett

[57] ABSTRACT

A system for communicating a data channel composed of a multiplicity of telephone-type messages wherein the invention incorporates circuitry for modulating service channel data onto a carrier of the telephone channel data and for demodulating the service data without interfering with the telephone data. An inverse modulator driven by detected telephone data is utilized to recover a carrier which is then tracked by a tracking filter to recover the service data.

10 Claims, 3 Drawing Figures

PLURAL CHANNEL COMMUNICATIONS SYSTEM

BACKGROUND OF THE INVENTION

One commonly used system for communicating a multiplicity of telephonic messages includes multiplexing techniques wherein samples of a plurality of telephone circuits are rapidly sampled with the samples being interleaved in time sequence in a well-known fashion which permits these samples to be demultiplexed whereupon the original telephonic messages can be recovered. The multiplexed messages are often transmitted by a wireless transmission link at a suitable carrier frequency such as an X-band carrier frequency.

A problem arises in that it is frequently desirable to inject an additional data channel into the communication link at a point removed from the location of the aforesaid multiplexing and for removing this additional data at a point distant from the location of the aforesaid demultiplexing. Such a data channel is frequently referred to as a service channel and serves the function of allowing operators of the telephone equipment to communicate with each other without interfering with the multiplexed telephonic messages.

SUMMARY OF THE INVENTION

The aforesaid problem is overcome and other features are provided by a system which, in accordance with the invention, provides for a frequency or phase modulation of service channel data onto a carrier, such as an X-band carrier, which has a frequency much greater than the frequencies of the service channel which may be a multiplexed data channel, and means for modulating multiplexed telephonic data or other data having a bandwidth similar to that of multiplexed telephonic data of a multiplicity of telephone circuits onto the carrier which has been previously modulated with the service channel data. The bandwidth of the service channel is very much smaller than the bandwidth of the multiplexed data channel so that the modulation of the carrier with the service channel data does not interfere with the spectrum of the multiplexed data. Demodulation of the service channel data is accomplished by inverse modulation of the X-band signal, this inverse modulation being done preferably at a suitable intermediate frequency, this inverse modulation being done in a feedback loop utilizing detected multiplexed data to recover the carrier of this data. Such recovery permits the utilization of quadrature phase shift keying techniques in the modulation of the multiplexed data upon its carrier. A tracking filter comprising an inductor-capacitor circuit in which the capacitance is adjustably provided by a varactor is utilized in the preferred embodiment of the invention to provide a tracking filter capability with a reduced number of components and increased reliability. A phase detector compares the input and output signals of the tracking filter for developing a control signal which adjusts the capacitance of the varactor. This control signal contains the service channel data.

BRIEF DESCRIPTION OF THE DRAWINGS

The aforementioned aspects and other advantages of the invention are explained in the following description taken in connection with the accompanying drawings wherein:

FIG. 3 is a block diagram of an alternative filter for the signal processor of FIG. 2.

DESCRIPTION OF THE PREFERRED EMBODIMENT

Figure 1:
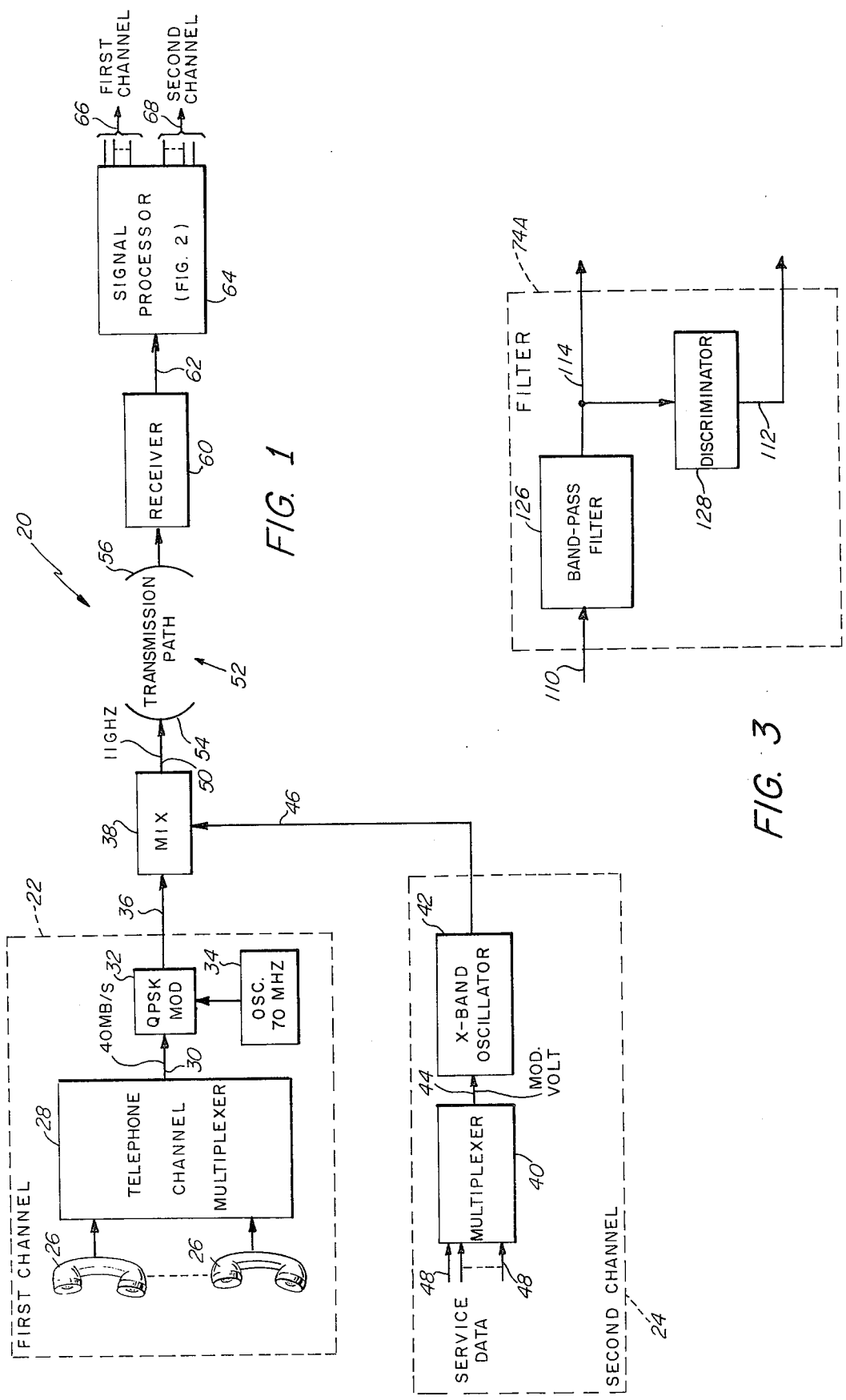
FIG. 1 is a block diagram of a system employing the inverse modulator and tracking filter of the invention.

Referring now to FIG. 1, there is seen a system 20 which, in accordance with the invention, provides for the modulation of data of a first channel 22 upon a carrier which is modulated with data of a second channel 24. The first channel is seen to comprise, by way of example, a plurality of telephone hand sets 26 which are coupled to a multiplexer 28. The multiplexer 28 comprises well-known sampling circuitry which sequentially samples the signals of the individual hand sets 26 and interleaves these samples in a predetermined order to provide on line 30 a digital signal at a rate of 40 megabits per second. The signal on line 30 is then modulated by a modulator 32 onto a 70 megahertz carrier provided by an oscillator 34, the modulator 32 providing a 4-phase or quadrature phase shift keying modulation. Such a modulation is described in the book "Data Transmission" by William R. Bennett and James R. Davey which was published by McGraw-Hill Book Company in 1965. A feature of this modulation technique is good utilization of the available spectrum while the spectral line representing the carrier frequency is absent. The output of the modulator 32 is coupled along line 36 to a mixer 38.

The second channel 24 is seen to comprise, by way of example, a multiplexer 40 and an X-band oscillator 42. The oscillator 42 includes means for varying the frequency of the oscillations, and the multiplexer 40 provides a modulating voltage on line 44 for modulating the frequency of the oscillations. The output signal of the oscillator 42 is coupled by line 46 to the mixer 38 and serves as a carrier upon which the signal of line 36 is modulated by the mixer 38. The multiplexer 40 operates in a manner similar to that of the multiplexer 28 and includes well-known circuitry such as a digital-to-analog converter or delta modulator (not shown) for converting analog service data signals on lines 48 to digital signals at a 100 kilobits per second rate on line 44.

It is noted that the bandwidth of the signal on line 44 is very much smaller than the 70 megahertz frequency of the oscillator 34. Accordingly, the signal on line 46 may be considered as a carrier with a relatively slow modulation, the modulation being at a sufficiently slow rate to permit the signal of line 36 to be modulated onto the X-band signal of line 46 by the mixer 38 as if there were no modulation of the oscillator 42. The mixer 38 is understood to include an output filter which passes only one side band of the mixing operation so that a signal sent on a carrier of, for example, 11 gigahertz frequency, is provided on line 50.

The signal on line 50 is typically coupled via a wireless transmission path 52 which begins at a transmitting antenna 54, coupled to line 50, and terminates at a receiving antenna 56 which is coupled via line 58 to a receiver 60. The receiver 60 amplifies the signal on line 58 and translates it to an intermediate frequency, the translated signal being coupled via line 62 to a signal processor 64 which will be described with reference to FIG. 2. The signal processor 64 separates the service data of the second channel 24 from the telephonic data of the first channel 22, the first channel data appearing on line 66 and the second channel data appearing on line 68.

The service data provided on the lines 48 is typically telephonic communication between operators of the system 20 as well as other signals giving information on the availability of telephone circuits for the first channel 22. A feature of the invention is that the system 20 provides for the combining of the second channel 24 with the first channel 22 at a point that may be geographically removed from the multiplexer 28 and the modulator 32. This combining of the two channels, and the subsequent separation of the two channels by the signal processor 64, is accomplished without the utilization of any of the telephone circuits coupled to the multiplexer 28 and without creating any substantial interference with the spectrum of the modulated signal appearing on line 36 at the output of the modulator 32. And, as will be seen with reference to FIG. 2, the separation of the two channels 22 and 24 is accomplished in a manner which is relatively free of equipment complexity.

Figure 2:
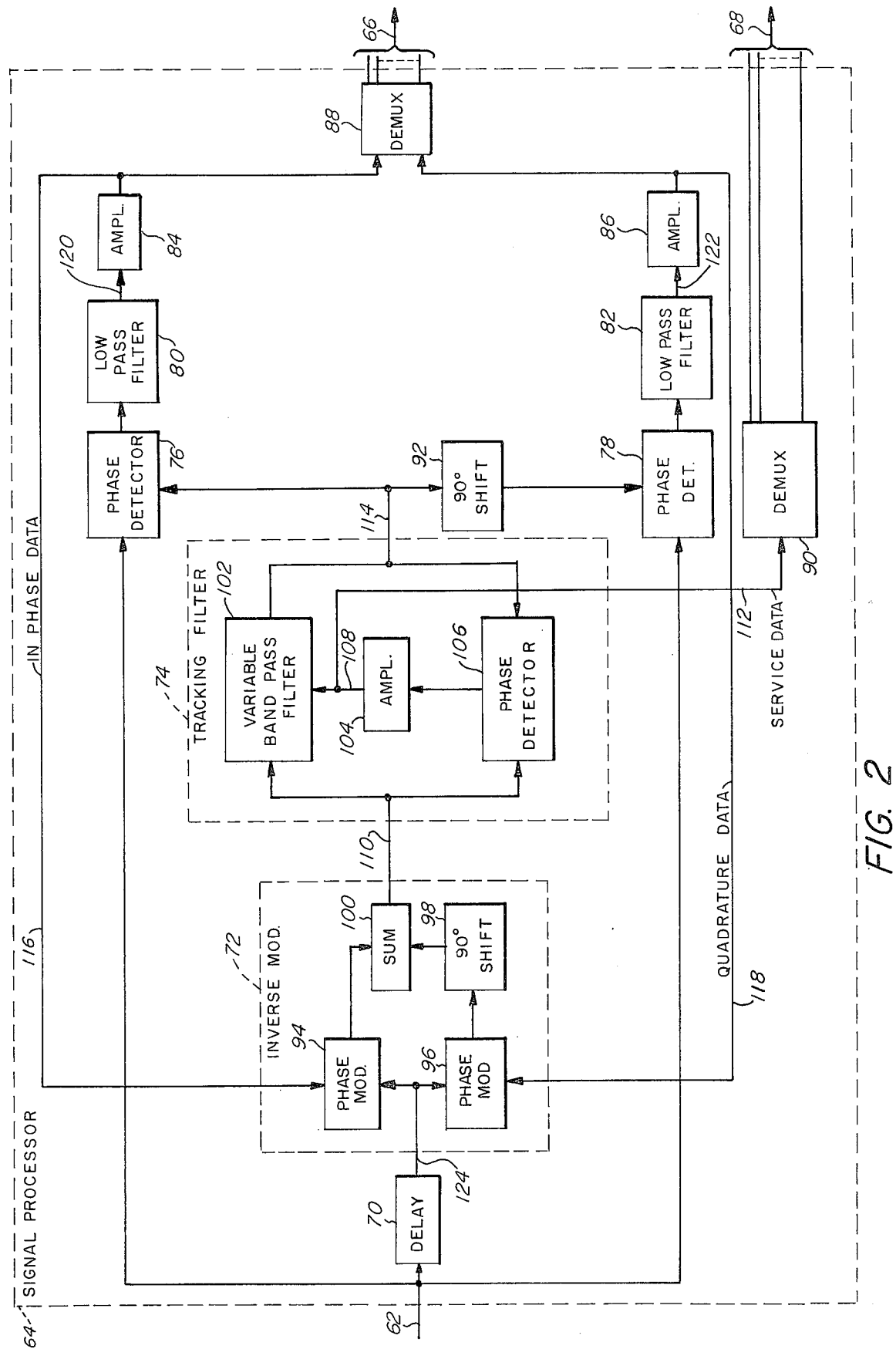
FIG. 2 is a block diagram of a signal processor of FIG. 1 further describing the inverse modulation and the tracking filter.

Referring to FIG. 2 there is seen a block diagram of the signal processor 64, the figure showing the lines 62, 66 and 68 which were previously seen in FIG. 1 and represent, respectively, the coupling of the signal from the receiver 60, the telephonic communications of the first channel 22 and the service data of the second channel 24. The signal processor 64 is seen to comprise a delay unit 70, an inverse modulator 72, a tracking filter 74, phase detectors 76 and 78, low-pass filters 80 and 82, amplifiers 84 and 86, demultiplexers 88 and 90 and a phase shifter 92 providing 90° of phase shift. The inverse modulator 72 comprises phase modulators 94 and 96, a phase shifter 98 similar to the phase shifter 92, and a summer 100 for summing together the outputs of the phase modulator 94 and the phase shifter 98. The tracking filter 74 comprises a bandpass filter 102 which includes means for varying the center frequency of the pass band, an amplifier 104 and a phase detector 106. The filter 102 comprises, in the preferred embodiment of the invention, a varactor having a capacitance which is varied in response to the amplitude of a signal on line 108, the varactor serving to tune an inductor (not shown) of the filter 102 to provide the variable passband.

As was mentioned with reference to FIG. 1, the quadrature phase modulation of the modulator 32 provides for a spectrum in which the carrier line is absent. The inverse modulator 72 regenerates the carrier frequency and passes the regenerated frequency signal via line 110 to the tracking filter 74. The tracking filter 74 tracks the frequency of the signal on line 110 and recovers the modulation associated with the second channel 24 of FIG. 1. The recovered modulation appears on line 112. The carrier, after having been filtered by the tracking filter 74, appears on line 114 and is utilized as a reference signal for operating the phase detector 76 and, via the phase shifter 92, for operating the phase detector 78.

It is noted that two feedback signals are provided along lines 116 and 118 which couple signals, respectively, from the amplifier 84 to the phase modulator 94, and from the amplifier 86 to the phase modulator 96. With respect to the feedback path on line 116, the phase detector 76 demodulates the signal on line 62 to provide, in cooperation with the low-pass filter 80, a digital waveform signal on line 120 having a sequence of voltage states corresponding to a logic 1 or a logic 0; these voltage states on line 120 correspond sequentially to alternate ones of the voltage states appearing on line 30 of FIG. 1. Similar comments apply to the action of the phase detector 78 and the low-pass filter 82 in providing a signal on line 122 in which the successive values of voltage or logic states correspond sequentially to the remaining ones of the logic states on line 30. As noted in FIG. 2, the line 116 is labelled "in-phase data" while the line 118 is labelled "quadrature data." This difference in the detected output results because of the 90° phase shift introduced by the phase shifter 92 in the reference signal of the phase detector 78 relative to the reference signal of the phase detector 76.

The use of the in-phase and quadrature signals on lines 116 and 118 in the inverse modulation by the modulator 72 corresponds to the quadrature phase shift keying by the modulator 32 of FIG. 1. Such modulation is typically accomplished by taking alternate bits of the bit stream on line 30 and applying them to in-phase and quadrature portions of the modulator 32, the in-phase portion providing either 0° or 180° phase shift while the quadrature portion provides ± 90° phase shift.

The inverse modulator 72 and the tracking filter 74 introduce a phase shift which is substantially invariant with the frequency modulation of the carrier on line 110. Thus, the phase modulators 94 and 96 as well as the summer 100 employ circuitry which is relatively wide-band as compared to the bandwidth of the modulation provided by the second channel 24 of FIG. 1. The phase shifter 98, the phase detector 106 and the amplifier 104 are of similarly wide bandwidth. The bandwidth of the variable filter 102 is of relatively narrow bandwidth as compared to the modulation of the second channel 24; however, the variable filter 102 is continuously tuned in response to a signal of the phase detector 106 so that, with the exception of a small phase shift which is typically less than approximately 2° as is required to generate a correction signal by the phase detector 106, the phase shift introduced by the variable filter 102 is essentially invariant with the frequency modulation introduced by the second channel 24.

The low-pass filters 80 and 82, in addition to the aforementioned filtering of the sidebands produced by the phase detectors 76 and 78, also introduce phase shifts to their respective digital signals. The low-pass filter 80 and its amplifier 84, as well as the low-pass filter 82 and its amplifier 86, are adjusted to provide a phase shift and loop gain to signals passing through the feedback paths on lines 116 and 118 to provide stable operation of the feedback loops in a manner well-known to feedback control theory. The adjustment of this phase shift is readily accomplished since substantially all of the phase shift in each of the feedback loops is accomplished respectively by the low-pass filters 80 and 82, the other components, namely, the inverse modulator 72, the tracking filter 74, the phase detectors 76 and 78, the phase shifter 92 and the amplifiers 84 and 86 being of sufficiently wide band to introduce substantially no phase shift at the carrier frequency. And, furthermore, as will now be explained, the digital modulation is absent on the line 110 so that the tracking filter 94 introduces no phase shift to the digital modulation.

In order to insure that the digital signals on lines 116 and 118 are in step with the respective portions of the digital signal on line 124 which are applied respectively to the phase modulators 94 and 96, the delay introduced by the delay unit 70 is adjusted to equal the delays introduced by the low-pass filters 80 and 82.

In operation, therefore, signals received from the receiver 16 of FIG. 1 along line 62 are applied by the delay unit 70 along line 124 to the phase modulators 94 and 96. The signal on line 124 comprises an intermediary frequency carrier which is phase modulated at the phases 0°, 90°, 180° and 270°. The 0° and 180° phases represent the digital signals of the in-phase data while the 90° and 270° phases represent digital signals of the quadrature data. The signal voltage on line 116 causes the phase modulator 94 to apply a phase shift of 0° or −180°, thereby canceling the in-phase modulation present on the line 124. Similarly, the signal voltage on line 118 causes the phase modulator 96 to apply a −90° phase shift and a −270° phase shift thereby nulling out the quadrature digital signal on line 124. The residue of uncanceled modulation components from the phase modulator 94 are then summed together by the summer 100 with a residue of uncanceled phase shift components from the phase modulator 96 as passed by the phase shifter 98 to result in a carrier at the intermediary frequency which is void of the digital modulation associated with the first channel 22 of FIG. 1. Inverse modulators such as the inverse modulator 72 are further described in Chapter 8 of "Theory of Synchronous Communications" by J. Stiffler which was published by Prentice Hall in 1971.

The carrier on line 110 is then stripped of the frequency modulation associated with the second channel 24 of FIG. 1, as will be further described, so that an unmodulated carrier appears on line 114. The carrier on line 114 then serves as a reference in the phase detection of the digital signals on line 62 by means of the phase detectors 76 and 78. These signals are then filtered by the low-pass filters 80 and 82 and fed back via the lines 116 and 118 to accomplish the inverse modulation by the modulator 72. It is noted that prior to the reception of a signal on line 62, the signal processor 64 is in an oscillatory or hunting mode which then locks in upon the signal at line 62 when the signal on line 62 appears. It is noted that at the inception of the lock on, there is a double ambiguity for the signals on lines 116 and 118, namely, either line may actually have the in-phase component while the other line has the quadrature component and, furthermore, the signals may be at a logic state of 0 or 1 depending on the phase of the reference on line 114. Accordingly, differential incoding (as described in chapter 10-3 of the aforementioned book by Bennett and Davey) is utilized at the input of the modulator 32 and at the input of the demultiplexer 88 to resolve these ambiguities. The digital signals in the two feedback branches on the lines 116 and 118 are recombined in the demultiplexer 88 so that they have the same form as was originally presented on line 30 of FIG. 1. The individual samples of the multiplexed data are separated out by the demultiplexer 88 to reform the original telephonic messages associated with each of the hand sets 26 of FIG. 1, this being done in a manner well-known in the art of demultiplexing. Similar comments apply to the operation of the demultiplexer 90 in utilizing the data samples on line 112 to regenerate the service data on line 68.

With respect to the operation of the variable bandpass filter 102, it is noted that, in a simple form of such filter employing an inductor and a capacitor which resonate at the center frequency of the passband, the phase shift varies in a well-known manner across the passband such that a positive phase shift is imparted to signals having a frequency at one side of the center frequency while a negative phase shift is imparted to signals having a frequency at the other side of the center frequency. The resultant phase shift is sensed by the phase detector 106 and amplified by the amplifier 104, as was previously mentioned, to provide a voltage which operates a varactor to alter the capacitance for continuously varying the center frequency of the passband.

Referring now to FIG. 3, there is shown a filter 74A which is an alternative embodiment to the tracking filter 74 of FIG. 2. In the filter 74A, a bandpass filter 126 is utilized to filter the signal on line 110 to attenuate modulation transients which may occur at the phase modulators 94 and 96. The discriminator 128 demodulates the frequency modulation of the signal on line 110 to provide the samples of service data on line 112. The filter 74A offers simplicity over the tracking filter 74, however, the passband of the filter 126 is fixed tuned and is wider than the passband of the filter 102 to provide a small shift of the carrier as a function of the frequency changes of the frequency modulated signal of the second channel 24.

It is understood that the above-described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. A system for communicating a first signal and a second signal, said second signal having a spectrum wherein a carrier is present, said system comprising:
   means for mixing said first signal with said second signal;
   means coupled to said mixing means for transmitting said mixed signals from a first location to a second location;
   means at said second location coupled to said transmitting means for modulating said transmitted signal with a first and a second demodulated replica of said first signal to produce first and second modulator output signals, said modulating means including means for combining said first and second output signals to produce said second signal;
   means coupled to said modulating means for filtering a carrier of said second signal resulting from said modulating; and
   first and second means coupled to said transmitting means and responsive to said carrier of said filtering means for demodulating said transmitted signal to provide said first and said second demodulated replica of said first signal, one of said demodulating means including means for shifting the phase of a carrier coupled to said one demodulating means relative to the phase of a carrier coupled to the other of said demodulating means, said demodulating means coupling said demodulated replica of said first signal to said modulating means.

2. A system according to claim 1 wherein said first signal is phase modulated signal having in-phase and quadrature modulation components.

3. A system according to claim 2 wherein said second signal is a frequency modulated signal.

4. A system according to claim 1 wherein said filtering means comprises a variable element, and means responsive to the input and the output of said filter for generating a control signal for controlling said variable element.

5. A system according to claim 4 wherein said first signal is a phase modulated signal having in-phase and quadrature modulation components, said second signal is a frequency modulated signal, said transmission means is a wireless transmission link, and said modulating means comprises an in-phase modulator and a quadrature phase modulator for modulating said transmitted signal.

6. A system according to claim 5 wherein said demodulating means comprises an in-phase detector and a quadrature phase detector for recovering the in-phase and the quadrature components of said first signal.

7. A system according to claim 6 wherein the output of said in-phase detector is coupled to said in-phase modulator, and the output of said quadrature phase detector is coupled to said quadrature phase modulator.

8. A system according to claim 7 wherein said controlling means of said filtering means provides said second signal.

9. A system utilizing a first signal and a second signal, said second signal having a spectrum wherein a carrier is present, said first signal being mixed with said second signal, said system comprising:
   means coupled to said mixed signals for modulating said mixed signals with a first and a second demodulated replica of said first signal to produce first and second modulator output signals, said modulating means including means for combining said first and second output signals to produce said second signal;
   means coupled to said modulating means for filtering a carrier of said second signal resulting from said modulating; and
   first and second means coupled to said transmitting means and responsive to said carrier of said filtering means for demodulating said transmitted signal to provide said first and said second demodulated replica of said first signal, one of said demodulating means including means for shifting the phase of a carrier coupled to said one demodulating means relative to the phase of a carrier coupled to the other of said demodulating means, said demodulating means coupling said demodulated replica of said first signal to said modulating means.

10. A system according to claim 9 including means for demodulating said second signal.

* * * * *